United States Patent
Bennett et al.

(10) Patent No.: US 12,418,215 B2
(45) Date of Patent: Sep. 16, 2025

(54) LIQUID-COOLED ELECTRIC DRIVE ASSEMBLY

(71) Applicant: Hydro-Gear Limited Partnership, Sullivan, IL (US)

(72) Inventors: Michael L. Bennett, Sullivan, IL (US); Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 248 days.

(21) Appl. No.: 18/318,522

(22) Filed: May 16, 2023

(65) Prior Publication Data

US 2023/0369935 A1    Nov. 16, 2023

Related U.S. Application Data

(60) Provisional application No. 63/365,395, filed on May 26, 2022, provisional application No. 63/364,768, filed on May 16, 2022.

(51) Int. Cl.
*H02K 5/20*   (2006.01)
*H02K 9/19*   (2006.01)
*H02K 11/33*  (2016.01)

(52) U.S. Cl.
CPC ............... *H02K 5/203* (2021.01); *H02K 9/19* (2013.01); *H02K 11/33* (2016.01); *H02K 2211/03* (2013.01)

(58) Field of Classification Search
CPC ............ H02K 5/20; H02K 5/203; H02K 9/19; H02K 9/193; H02K 9/197; H02K 9/20;
(Continued)

(56) References Cited

U.S. PATENT DOCUMENTS

| 4,818,906 A | 4/1989 | Kitamura et al. |
| 5,127,485 A | 7/1992 | Wakuta et al. |

(Continued)

FOREIGN PATENT DOCUMENTS

| CA | 2832519 | 10/2012 | |
| CN | 106411051 B | * 10/2019 | ............... H02K 5/20 |

(Continued)

OTHER PUBLICATIONS

Machine Translation of WO_2013080747_A1 (Year: 2013).*

(Continued)

*Primary Examiner* — Alexander A Singh
*Assistant Examiner* — Charlie Frank Mann, Jr.
(74) *Attorney, Agent, or Firm* — Neal, Gerber & Eisenberg LLP

(57) ABSTRACT

An electric motor and related components, such as a motor controller assembly, are disclosed having a coolant circuit where the related components are cooled by the same fluid flow that cools the electric motor. The compact coolant circuit minimizes the need for external lines between the electric motor and related components, while providing separate heat sinks for the electric motor and, for example, a motor controller assembly. The liquid-cooled electric motor and related components may engage and power a variety of reduction output assemblies to form drive assemblies. The coolant circuit of the electric motor and its related components cooperates with an external coolant circuit to form a cooling system. The external circuit may include a radiator (e.g., heat exchanger or oil cooler) and an electric pump for the coolant which may cool one or more drive assemblies of a vehicle drive system.

20 Claims, 12 Drawing Sheets

(58) Field of Classification Search
CPC .. H02K 9/22; H02K 9/12; H02K 9/14; H02K 9/16; H02K 11/33; H02K 11/35; H02K 11/38; H02K 2201/03
USPC .............................................. 310/54, 58, 59
See application file for complete search history.

(56) References Cited

U.S. PATENT DOCUMENTS

| | | | |
|---|---|---|---|
| 5,491,370 | A | 2/1996 | Schneider et al. |
| 6,201,365 | B1 | 3/2001 | Hara et al. |
| 7,687,945 | B2 | 3/2010 | Matin et al. |
| 8,191,342 | B2 | 6/2012 | Ishii et al. |
| 8,240,414 | B2 | 8/2012 | Sasahara et al. |
| 9,000,631 | B2 | 4/2015 | Prix |
| 9,220,182 | B2 | 12/2015 | Otsuka et al. |
| 9,307,680 | B2 | 4/2016 | Schmit |
| 9,966,818 | B2 | 5/2018 | Lee |
| 10,780,849 | B1 | 9/2020 | Garcia et al. |
| 11,005,326 | B2 | 5/2021 | Heien et al. |
| 11,211,844 | B1 | 12/2021 | Bonny et al. |
| 2012/0153718 | A1 | 6/2012 | Rawlinson et al. |
| 2012/0161554 | A1 | 6/2012 | Ghelardi et al. |
| 2013/0049495 | A1* | 2/2013 | Matsuo .............. G06F 16/1748 310/59 |
| 2013/0119832 | A1* | 5/2013 | Nagao ................. H02K 5/203 310/68 B |
| 2015/0349594 | A1 | 12/2015 | Zhang et al. |
| 2016/0056683 | A1 | 2/2016 | Nakanishi et al. |
| 2016/0126800 | A1 | 5/2016 | Rusch |
| 2018/0159403 | A1 | 6/2018 | Yokoyama et al. |
| 2019/0181717 | A1 | 6/2019 | Zhou et al. |
| 2020/0036264 | A1* | 1/2020 | Lin ....................... H02K 11/33 |
| 2020/0177054 | A1 | 6/2020 | Van Seventer et al. |
| 2021/0339309 | A1 | 11/2021 | Bremner |
| 2021/0362586 | A1 | 11/2021 | Singh |
| 2023/0038386 | A1 | 2/2023 | Goykhman et al. |

FOREIGN PATENT DOCUMENTS

| | | | |
|---|---|---|---|
| DE | 10011518 | 9/2011 | |
| DE | 102015214053 | 1/2017 | |
| DE | 102021202754 | 11/2021 | |
| EP | 3078525 | 10/2016 | |
| EP | 3117695 | 1/2017 | |
| JP | 2014166031 | 9/2014 | |
| JP | 2022050184 A * | 3/2022 | ......... H02K 11/0094 |
| KR | 20210081937 A * | 7/2021 | ............ H02K 9/20 |
| WO | WO-2013080747 A1 * | 6/2013 | ............ H02K 11/33 |
| WO | WO-2016051535 A1 * | 4/2016 | ............ H02K 11/33 |
| WO | WO2021115632 | 6/2021 | |

OTHER PUBLICATIONS

Machine Translation of JP_2022050184_A (Year: 2022).*
Machine Translation of KR_20210081937_A (Year: 2021).*
Machine Translation of CN_106411051_B (Year: 2019).*
Machine Translation of WO_2016051535_A1 (Year: 2016).*
U.S. Appl. No. 17/658,171, filed Apr. 6, 2022, 23 pp.
International Search Report and Written Opinion for PCT/US2023/067068 dated Sep. 14, 2023, 10 pp.

* cited by examiner

LIQUID-COOLED ELECTRIC DRIVE ASSEMBLY

CROSS-REFERENCE TO RELATED APPLICATIONS

This application claims the benefit of U.S. Provisional Patent App. No. 63/365,395, filed on May 26, 2022, and U.S. Provisional Patent App. No. 63/364,768, filed on May 16, 2022. These prior applications are incorporated by reference herein in their entirety.

BACKGROUND

This application relates to electric motors incorporating coolant circuits for liquid cooling of the electric motor as well as related components thereof. The liquid-cooled electric motors may be used in motive units such as drive assemblies for lawn and garden equipment, off-road vehicles, utility vehicles and the like.

SUMMARY

An electric motor and its related components, such as a motor controller assembly, are disclosed herein having a coolant circuit where the related components are cooled by the same fluid flow that cools the electric motor. The compact nature of the disclosed coolant circuit minimizes the need for external lines between the electric motor and its related components, while still providing separate heat sinks for the electric motor and, for example, a motor controller assembly. The liquid-cooled electric motor and related components may engage and power a variety of reduction output assemblies to form complete drive assemblies. The coolant circuit of the electric motor and its related components cooperates with an external coolant circuit to form a complete cooling system. The external circuit may include an external radiator (e.g., heat exchanger, oil cooler, etc.) and an electric pump for the circulated coolant which may cool one or more drive assemblies of a vehicle drive system.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
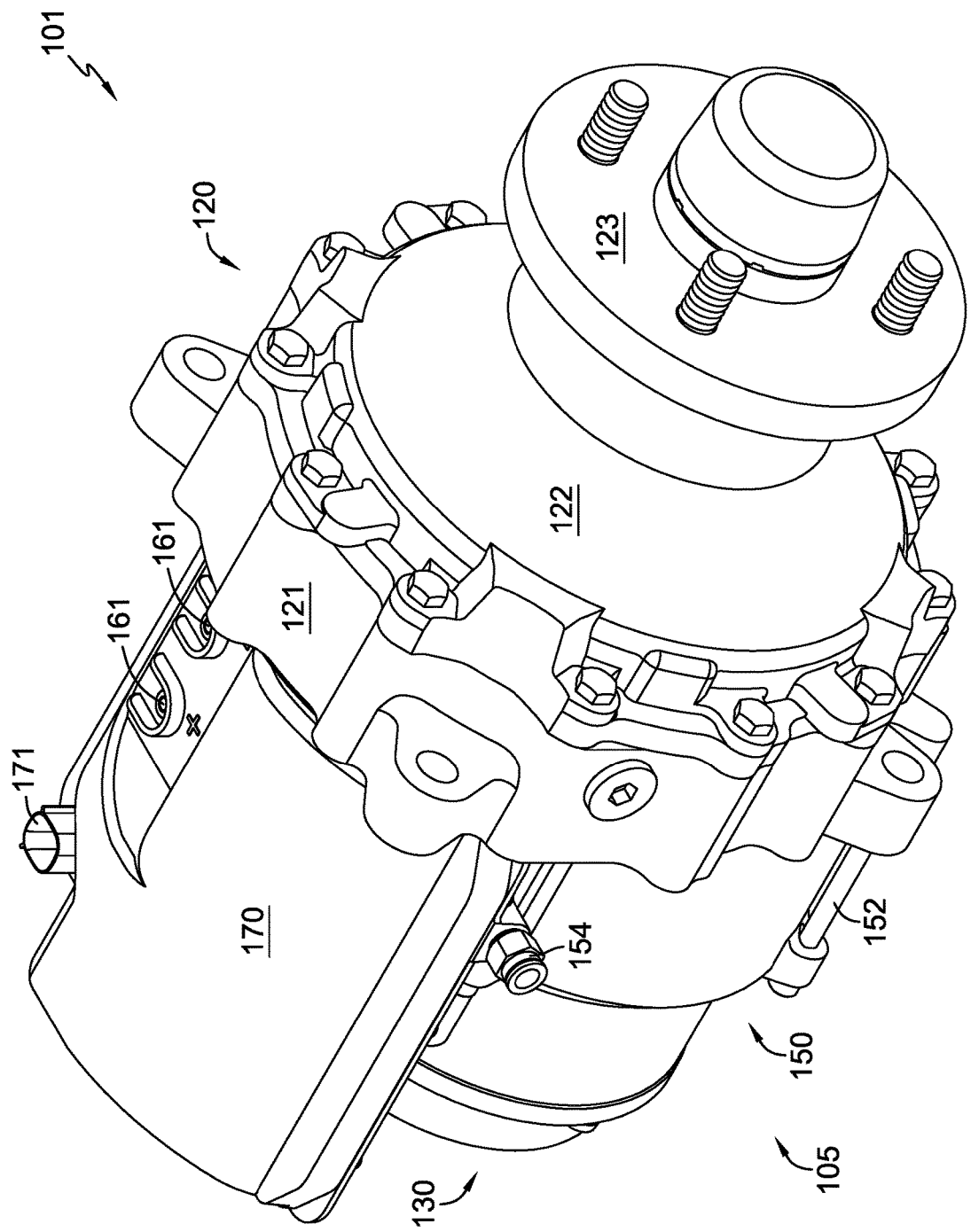
FIG. 1 is a perspective view of a liquid-cooled electric drive assembly in accordance with the teachings herein.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

As shown in FIGS. 1-6, 9, 10 and 11, the liquid-cooled electric drive assembly 101 of the present disclosure comprises a liquid-cooled electric motor assembly 105 (including an integrated motor controller assembly 112) engaged to and driving a reduction output assembly 120 including an output hub 123 driven by an output axle 124. More specifically, an electric motor 110 is disposed inside a housing structure 150, which may also be referred to herein as a motor and brake housing 150. One end of motor and brake housing 150 is engaged to motor attachment points 121a of gear housing 121 of reduction output assembly 120 by means of fasteners 152. Gear housing 121 is joined to axle housing 122, from which axle 124 extends. The embodiment depicted in FIGS. 1-6, 9, 10 and 11 includes a planetary reduction gear set 125 driven by motor output shaft 111, which is supported by input bearing 129.

An electric brake assembly 130 having a brake cover 131 is secured to an opposite end of the motor and brake housing 150. The disclosed brake assembly may be of a standard electric brake design for electric motors as is known in the art. The disclosed brake assembly may also be similar in configuration to those disclosed in commonly-owned U.S. application Ser. No. 17/658,171 filed on Apr. 6, 2022 and commonly-owned U.S. Pat. No. 11,211,844, the terms of which are incorporated herein by reference.

Electric motor 110 may be of a conventional configuration and in the illustrated embodiment comprises a rotor 116, a plurality of magnets 117 and a stator 118 having a plurality of stator winding slots 118a retaining motor windings 119. These components are at least partially disposed inside a motor cooling jacket 140, which will be described in more detail below.

A motor controller assembly 112 is integrated as part of electric motor assembly 105 of drive assembly 101 and comprises a motor and brake control board 160 comprising DC power terminals 161, AC power terminals 162, a plurality of field-effect transistors (FETs) 163 retained by FET bars 164 and FET bar fasteners 165, and thermal pads 166. A control board cover 170 encloses the motor and brake control board 160 and is connected to an electrical and cooling interface platform 151. A CAN-bus connector 171 is provided for vehicle integration. The control board 160 includes electrical inverter components to convert direct current to alternating current.

As will be discussed in more detail herein, a coolant flow path is provided to allow coolant to circulate through a coolant pathway or cavity 150b adjacent to motor and brake control board 160, then circulate about electric motor 110 via motor cooling jacket 140, and finally through an external coolant circuit to other components of a complete cooling system, including a radiator or heat exchanger 204 and an electric pump 203, such as those depicted in FIGS. 7 and 8. The coolant may be a liquid such as water, oil, water-based antifreeze mixes featuring propylene glycol, ethylene glycol, ethanol, glycerin or the like depending on the necessary heat capacity required to cool electric drive assembly 101. Coolant pathway 150b comprises several passages and resembles a "cavity" when covered by passage cover 167 and gasket 168, and therefore is referred to as a "coolant cavity" herein. In the depicted embodiment, platform 151 comprising coolant cavity 150b is integrally formed as part of the motor and brake housing 150. It will be understood that the liquid coolant cavity 150b and platform 151 could be separately formed and attached to motor and brake housing 150, with the use of seals and gaskets as needed.

Figure 2:
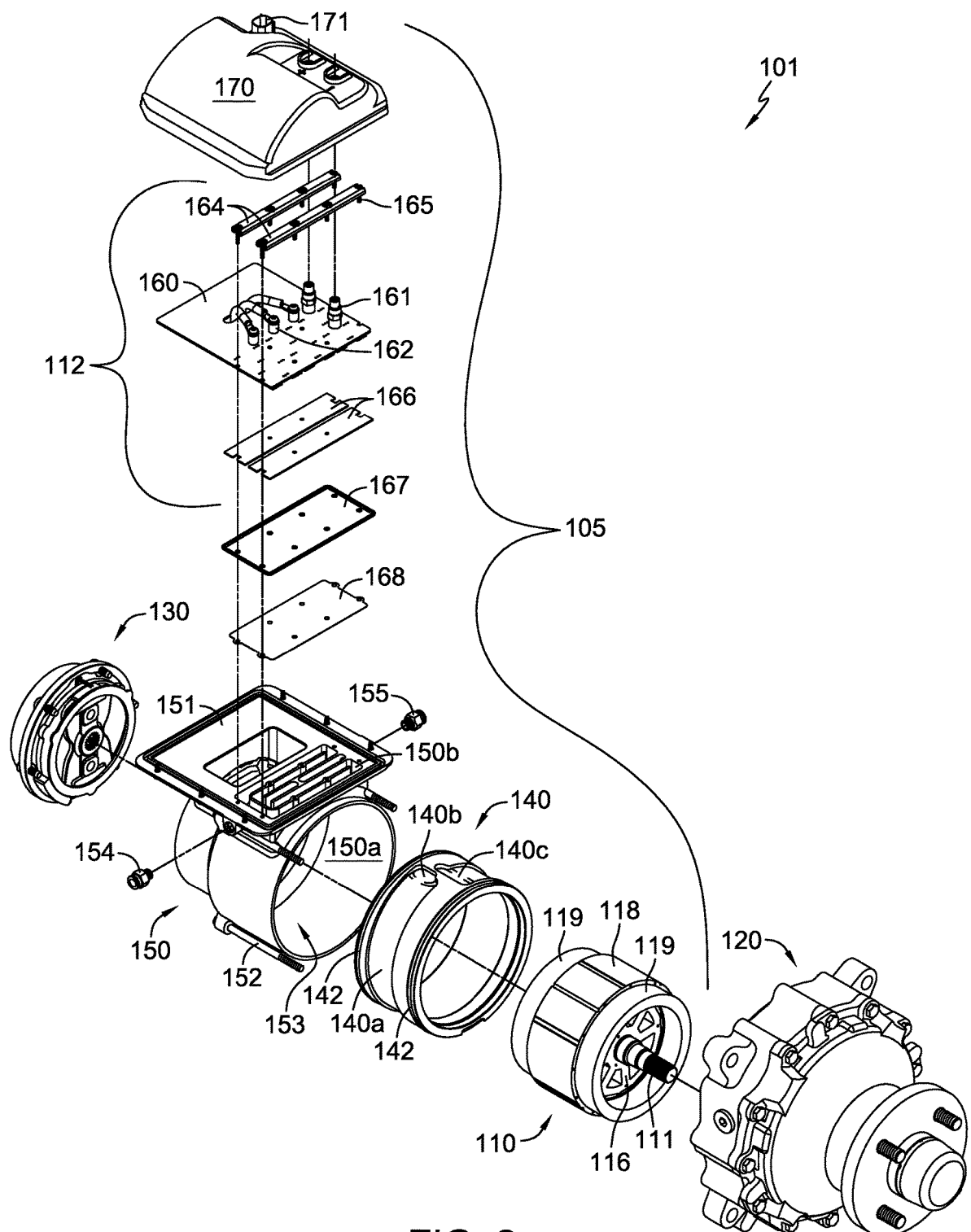
FIG. 2 is an exploded perspective view of the liquid-cooled electric drive assembly of FIG. 1.
Figure 3:
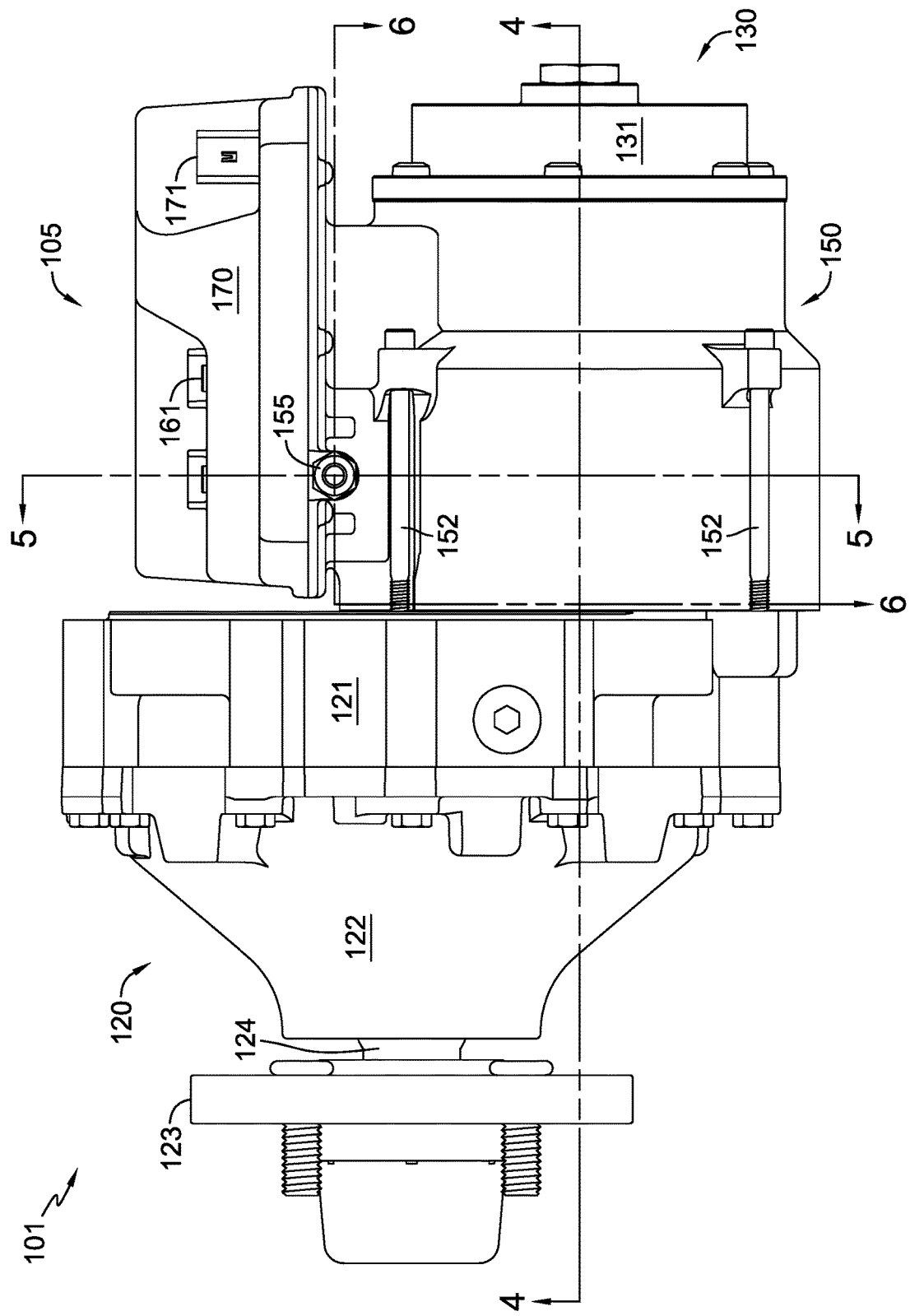
FIG. 3 is a side elevational view of the liquid-cooled electric drive assembly of FIG. 1.
Figure 4:
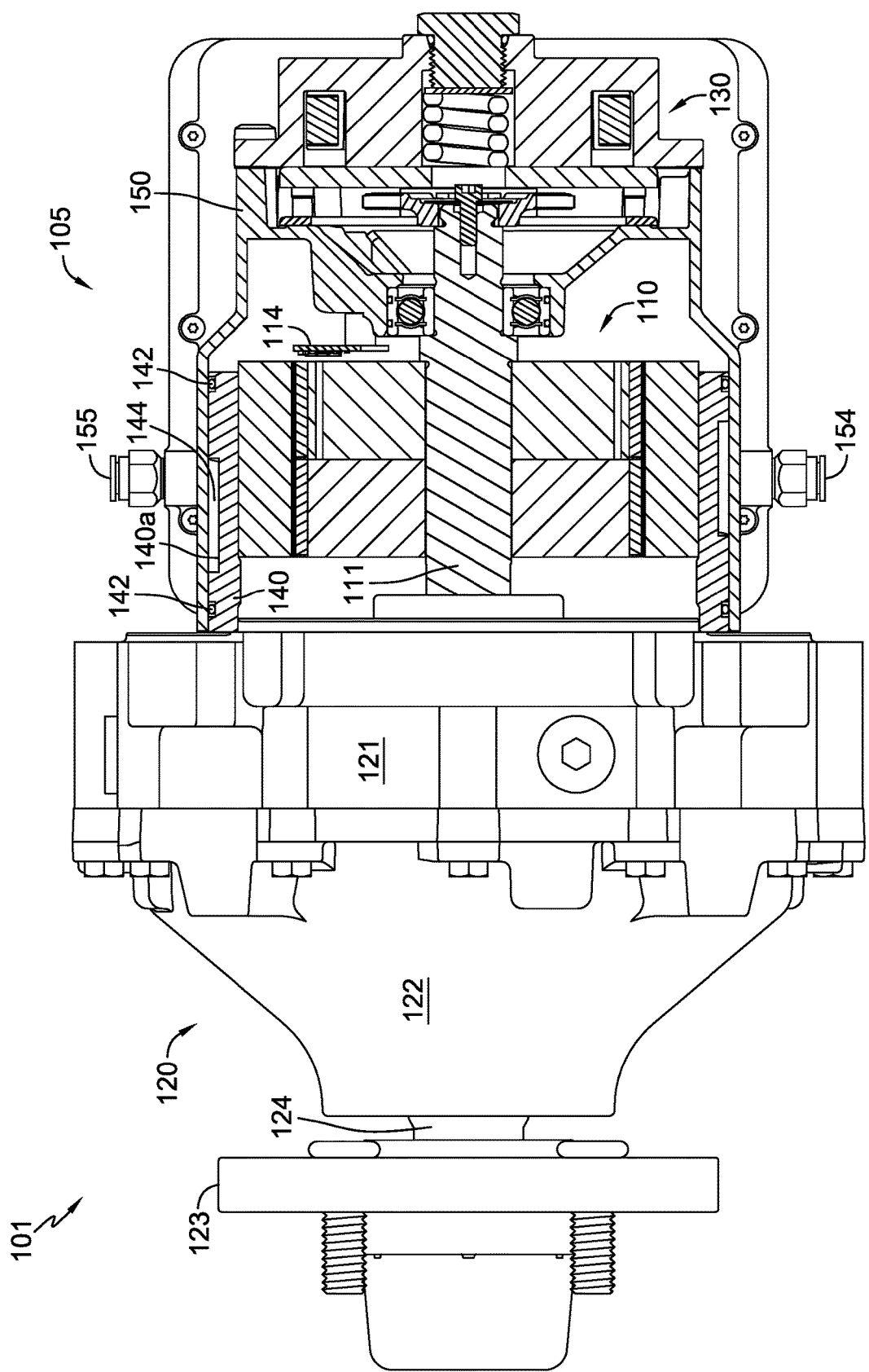
FIG. 4 is a cross-sectional view of the liquid-cooled electric drive assembly along the line 4-4 of FIG. 3, including a reduction output assembly that is not sectioned, and with wiring and certain related components omitted for clarity.
Figure 5:
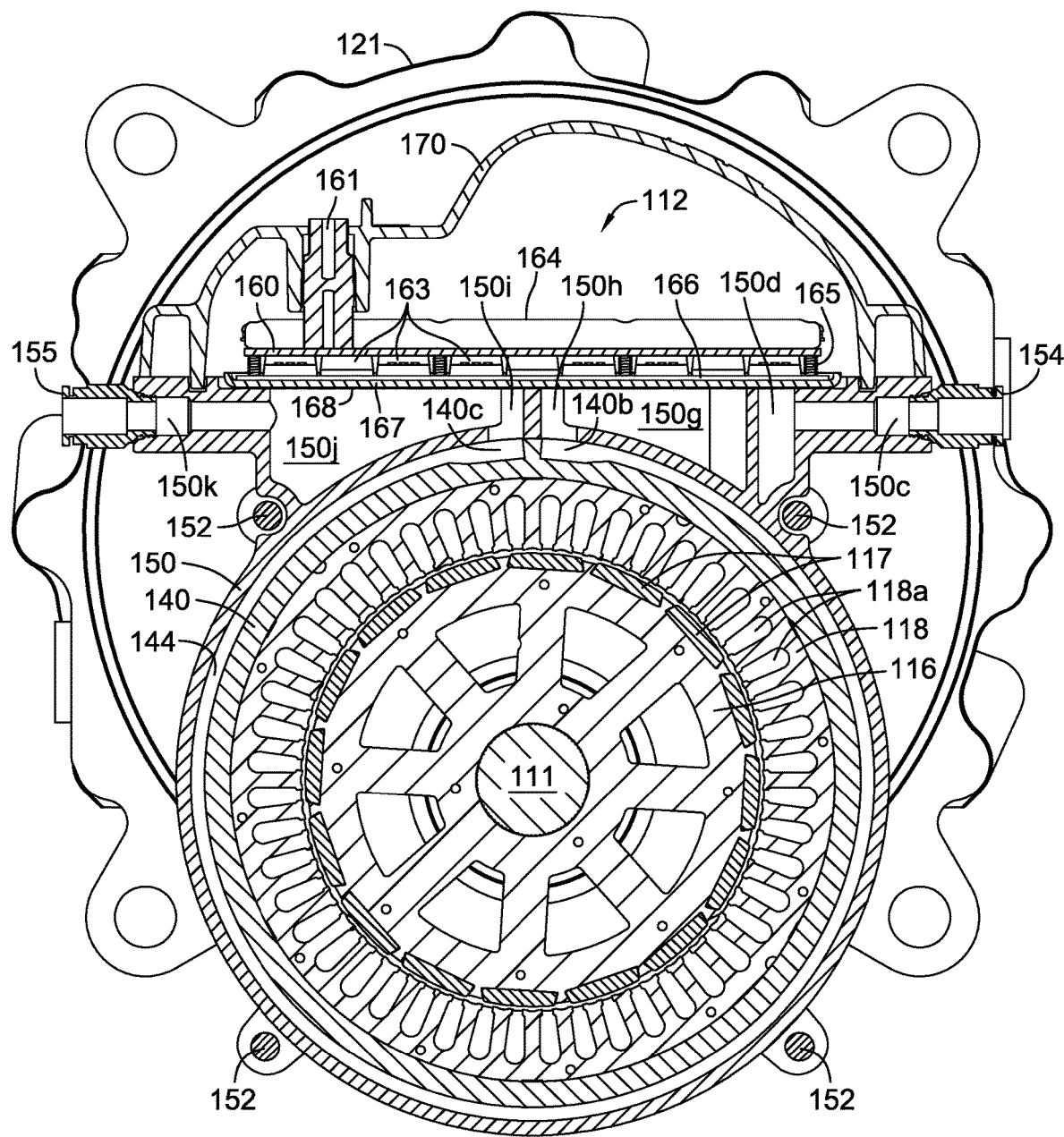
FIG. 5 is a cross-sectional view of the liquid-cooled electric drive assembly along the line 5-5 of FIG. 3, with wiring and certain related components omitted for clarity.
Figure 6:
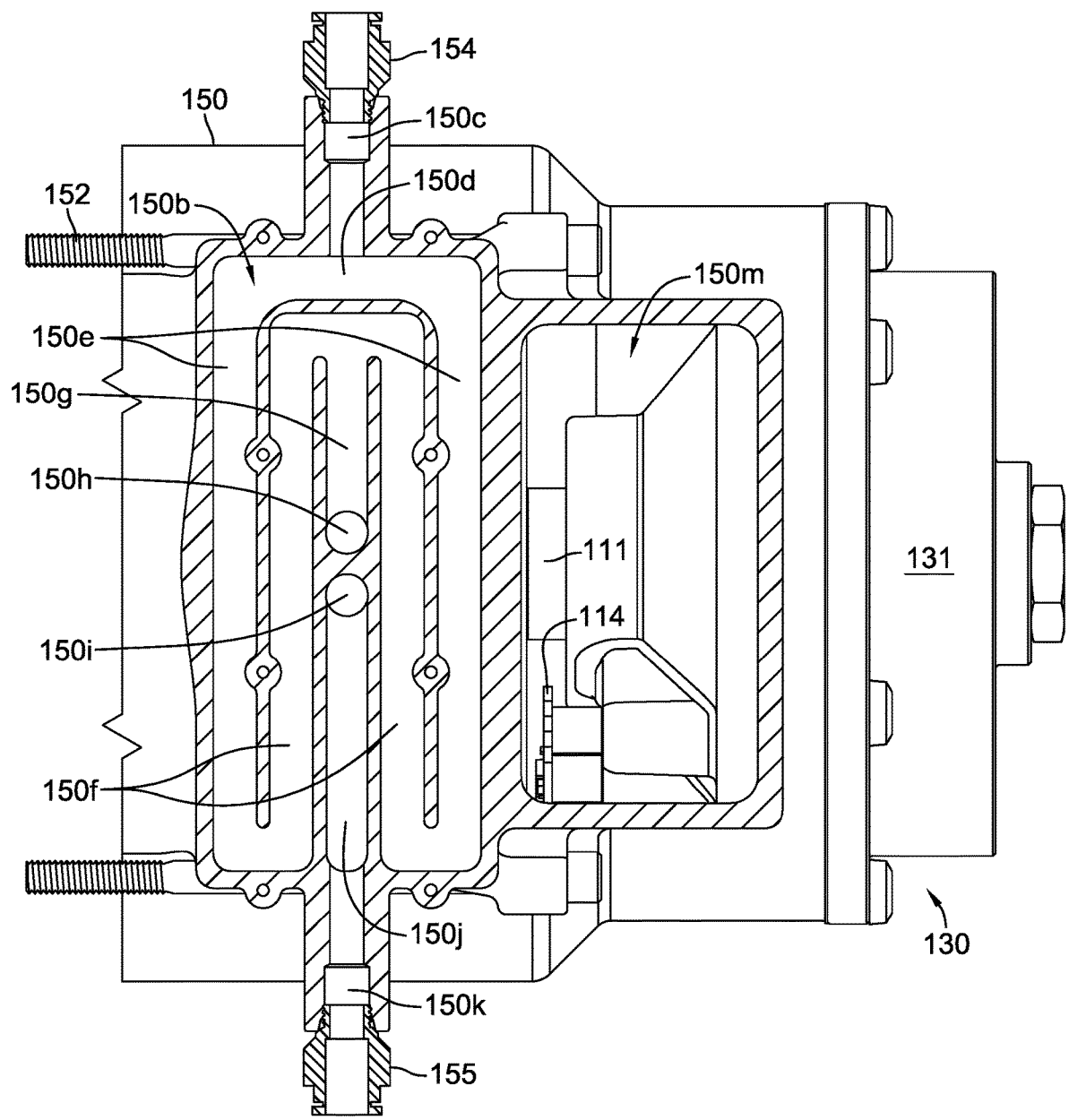
FIG. 6 is a cross-sectional view of the liquid-cooled electric drive assembly along the line 6-6 of FIG. 3, with wiring and certain related components omitted for clarity.

A portion of the coolant flow path and related components are depicted in FIG. 6, which shows the liquid coolant cavity 150b formed as part of motor and brake housing 150, and in FIGS. 2, 4 and 5, which show the motor cooling jacket 140. Motor cooling jacket 140 is inserted in jacket chamber 153 of motor and brake housing 150. In the depicted embodiment, motor cooling jacket 140 and jacket chamber 153 is cylindrical within normal manufacturing tolerances. A coolant groove 140a extends around a portion of an external surface of jacket 140 and terminates at a first end 140b in a first depression, and terminates at a second end 140c in a second depression. Coolant groove 140a and an internal surface 150a of motor and brake housing 150 form a motor wrap coolant passage 144, and O-rings 142 are used to prevent leakage therefrom. Motor wrap coolant passage 144 is formed in the shape of a helix around jacket 140 in this embodiment as a result of machining and fluid flow considerations. First end 140b and second end 140c are formed as minor depressions in the coolant groove 140a to improve flow when coolant enters and exits motor wrap coolant passage 144 as described below.

Motor and brake housing 150 has an inlet port 150c with an inlet fitting 154 disposed therein to connect this drive assembly to external plumbing and other components of a cooling system which will be discussed in more detail below in connection with the embodiments shown in, e.g., FIGS. 7 and 8. Coolant enters through inlet port 150c and into coolant volume split passage 150d. A set of cooling passages or channels 150e and 150f correspond to the location of FETs 163 and provide cooling thereto as coolant flows through cooling passages 150e and 150f and into jacket inlet run 150g. The coolant then exits cavity 150b through jacket inlet passage 150h, where it enters the first end 140b of motor wrap coolant passage 144.

As motor wrap coolant passage 144 extends circumferentially around (e.g., around most of the circumference of) the external surface of jacket 140, a flow of coolant around the external circumference of electric motor 110 provides cooling thereof. After the coolant has circulated around motor wrap coolant passage 144, it then exits motor wrap coolant passage 144 at the second end 140c of coolant groove 140a to return to coolant cavity 150b through jacket outlet passage 150i. Another channel, i.e., outlet run 150j is connected to outlet port 150k, which has a fitting 155 disposed therein to connect to the external plumbing of a cooling system. As discussed below, inlet port 150c may be connected to a first component of a cooling system and outlet port 150k may be connected to a second component of a cooling system as depicted in FIGS. 7 and 8.

As shown in FIG. 6, an electrical wiring passage 150m is also provided, separate from cavity 150b. Wiring passage 150m is used to route wiring from the motor windings 119 to the AC power terminals 162 on motor and brake control board 160, from a Hall effect sensors board 114 to motor and brake control board 160, and from electric brake assembly 130 to motor and brake control board 160. Passage cover 167 and gasket 168 are used to separate FETs 163 and other portions of the motor controller assembly from liquid coolant cavity 150b and to prevent unwanted leakage of the coolant.

Figure 10:
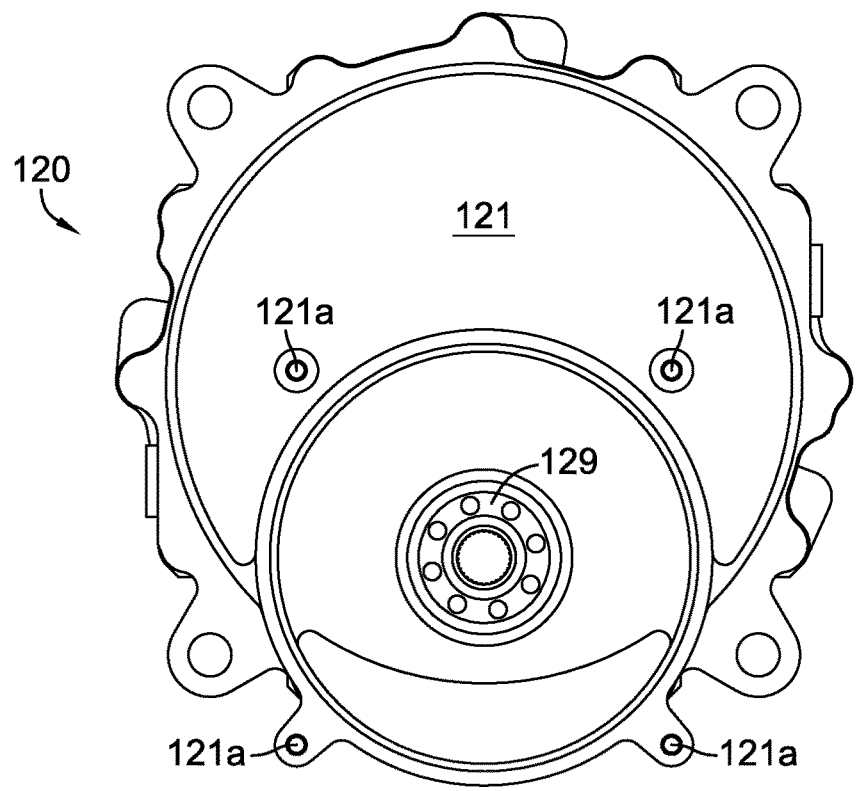
FIG. 10 is an elevational view of the reduction output assembly of FIG. 1.
Figure 11:
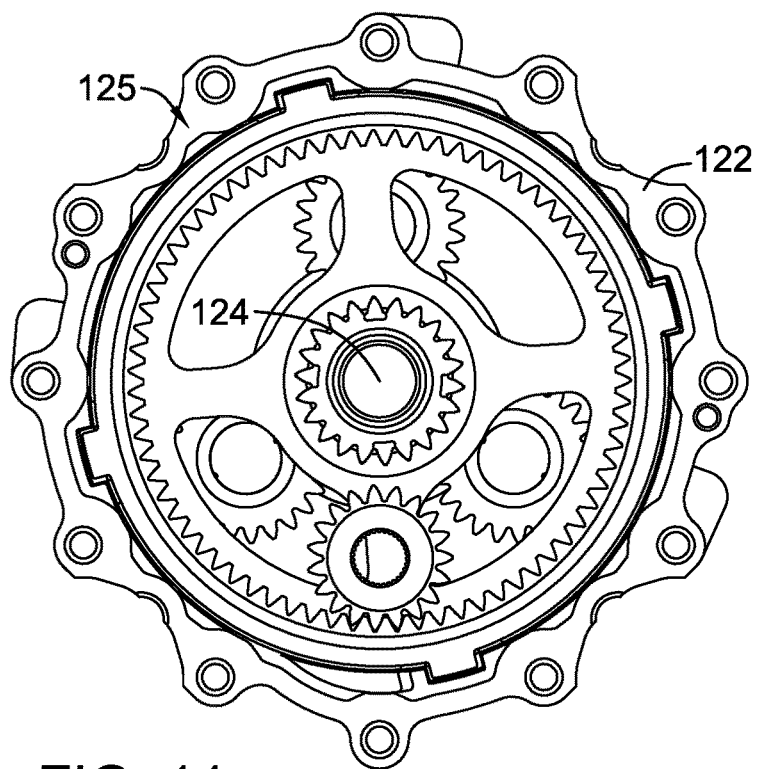
FIG. 11 is an elevational view of the reduction output assembly shown in FIG. 10, with a portion of the housing removed.
Figure 12:
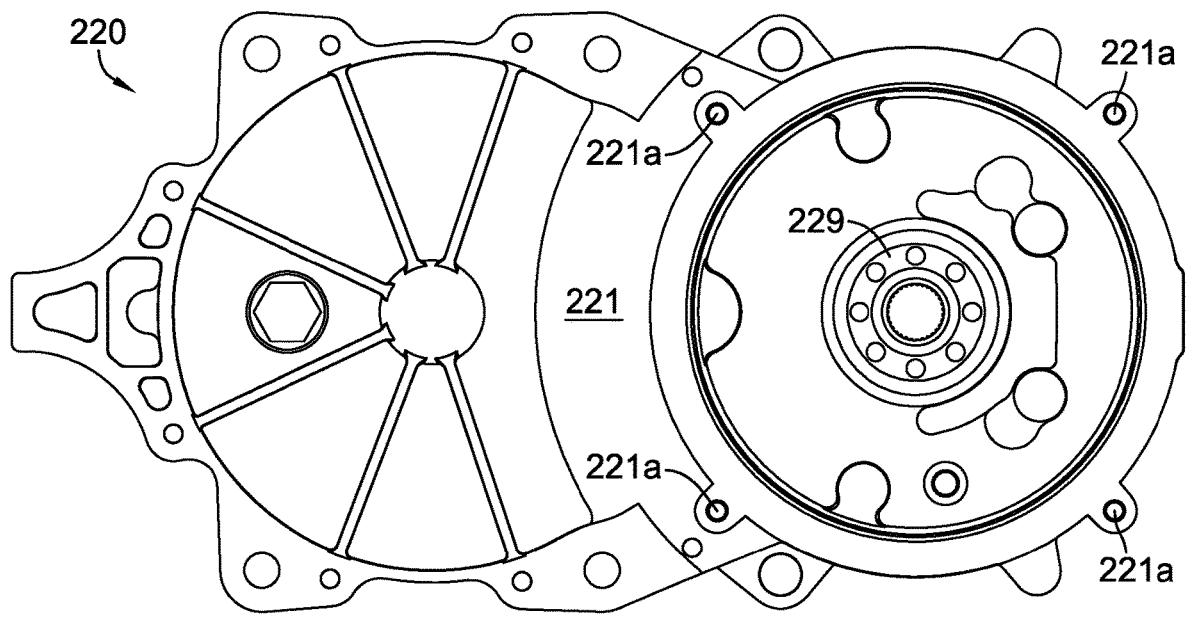
FIG. 12 is an elevational view of an alternative reduction output assembly for use with a liquid-cooled electric drive, as depicted in FIG. 7.
Figure 13:
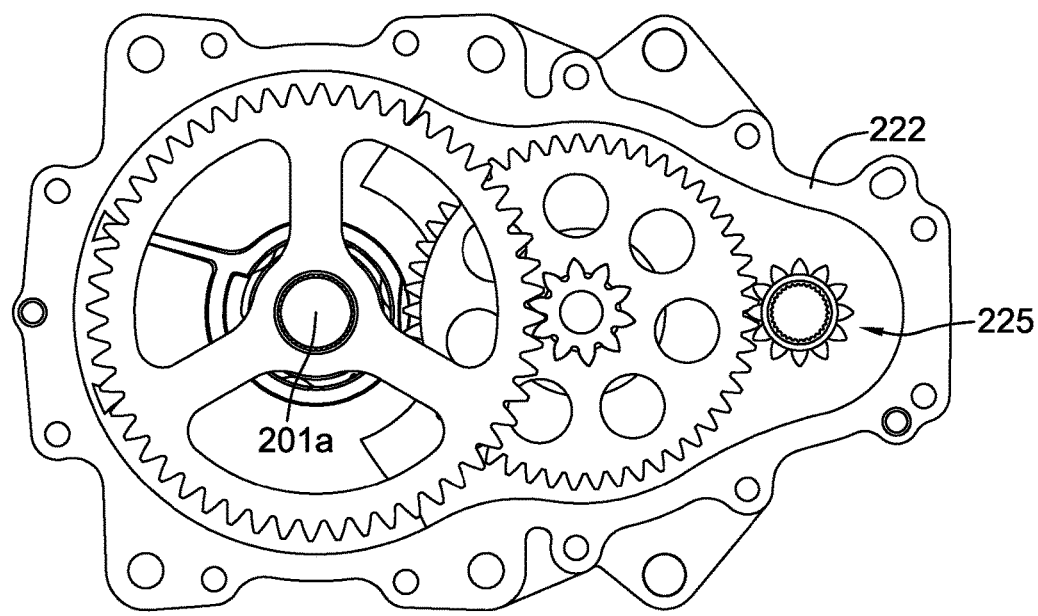
FIG. 13 is an elevational view of the reduction output assembly shown in FIG. 12, with a portion of the housing removed.

As noted above, the electric drive assembly 101 depicted in FIGS. 1-6 and 9 incorporates a planetary reduction drive, namely reduction output assembly 120 as depicted in more detail in FIGS. 10 and 11. A benefit of the disclosed design of liquid-cooled electric motor assembly 105 is the flexibility it provides for use with different output drive applications. For example, FIGS. 7 and 8 show alternative applications of the liquid-cooled electric motor assembly 105 in liquid-cooled vehicle drive systems 200, 300. FIGS. 12, 13, 14 and 15 disclose details of exemplary drive assemblies shown in drive systems 200, 300 and incorporating one or more liquid-cooled electric motor assemblies 105.

Figure 7:
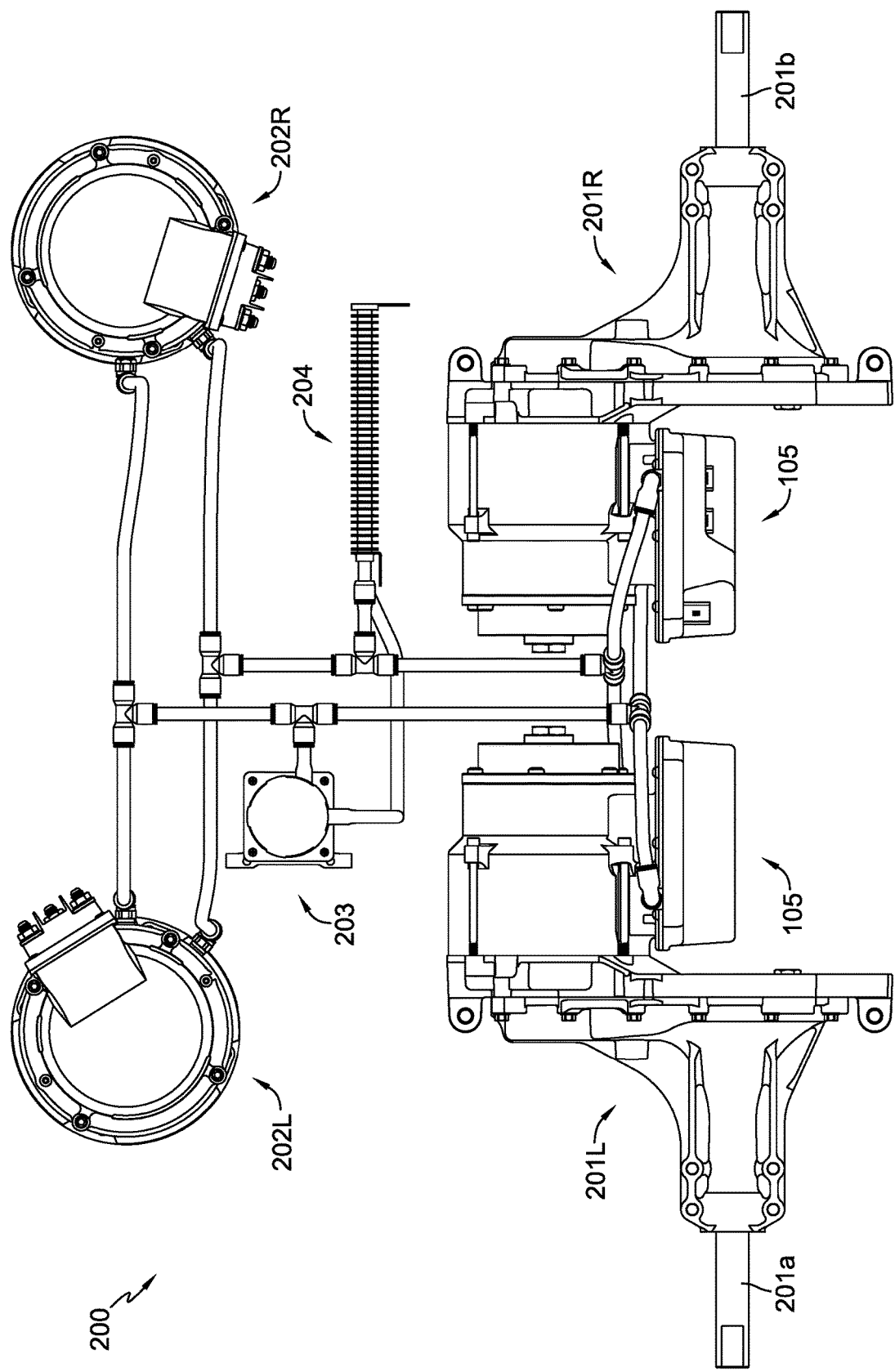
FIG. 7 is a plan view of a drive system using a pair of single-axle, liquid-cooled electric drive assemblies in accordance with the teachings herein.

The vehicle drive system 200 depicted in FIG. 7 includes a first liquid-cooled electric motor assembly 105 incorporated in a first drive 201L and a second liquid-cooled electric motor assembly 105 incorporated in a second drive 201R, and provides propulsion for a vehicle such as a lawn mower having zero-turn capability. Each drive 201L, 201R includes a conventional reduction gear train driven by motor output shaft 111 to transmit rotational output to first and second axles 201a and 201b. A hub similar to hub 123 may be mounted on each of the axles 201a and 201b. First drive 201L is shown in more detail in FIGS. 12 and 13, and comprises a reduction drive assembly 220 having an input housing 221 joined to an output housing 222. Motor output shaft 111 is supported by input bearing 229 and drives spur gear reduction set 225, which provides motive force to the respective output axles 201a (depicted in FIG. 13) and 201b. Attachment points 221a are used to connect to fasteners 152. It will be understood that the second drive 201R is essentially identical to the depicted first drive 201L. It will also be understood that a pair of drives 101 may be used in lieu of drives 201L, 201R in vehicle drive system 200 or in similar vehicle drive system configurations.

Figure 8:
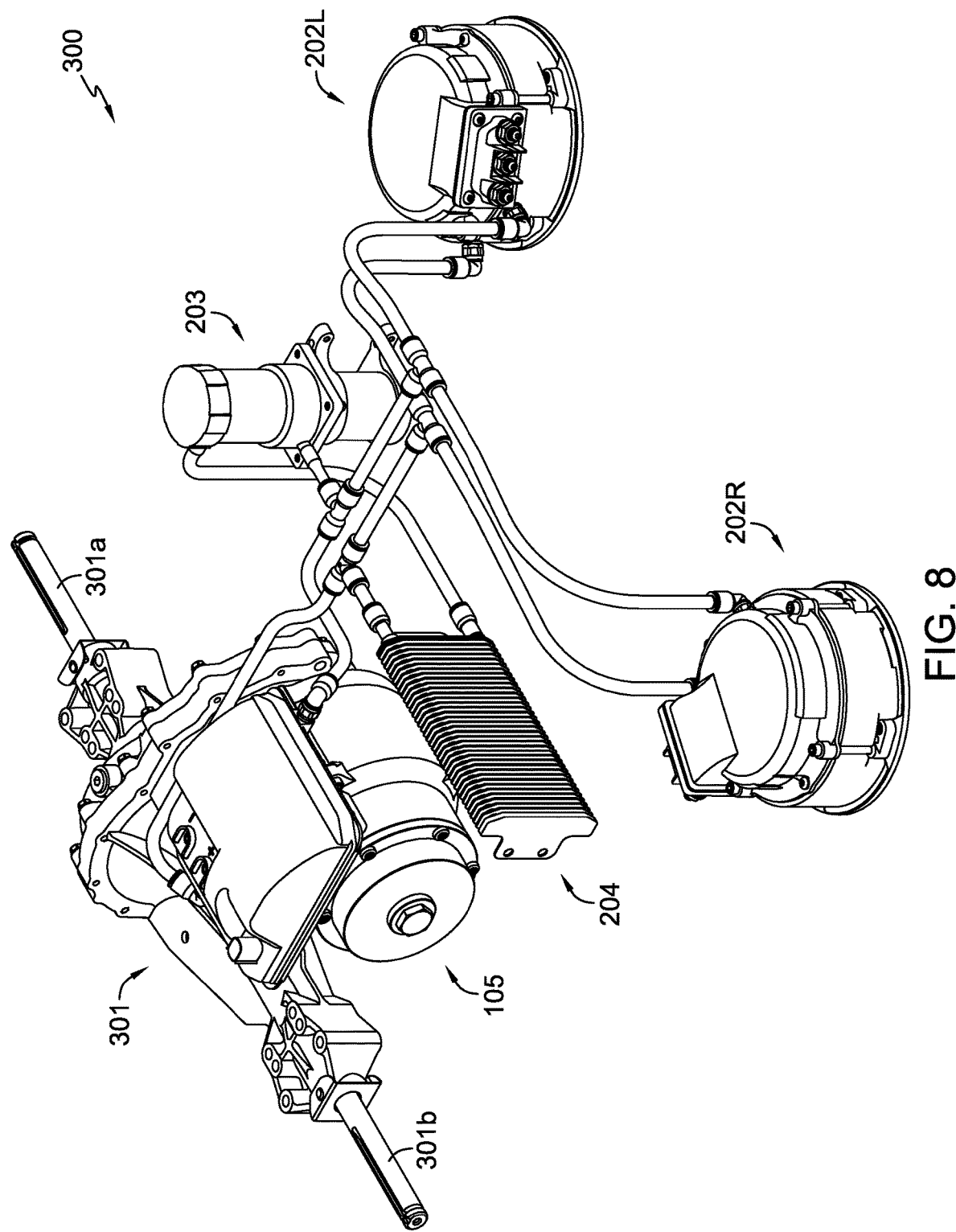
FIG. 8 is a perspective view of a drive system using a dual-axle, liquid-cooled electric drive assembly in accordance with the teachings herein.
Figure 9:
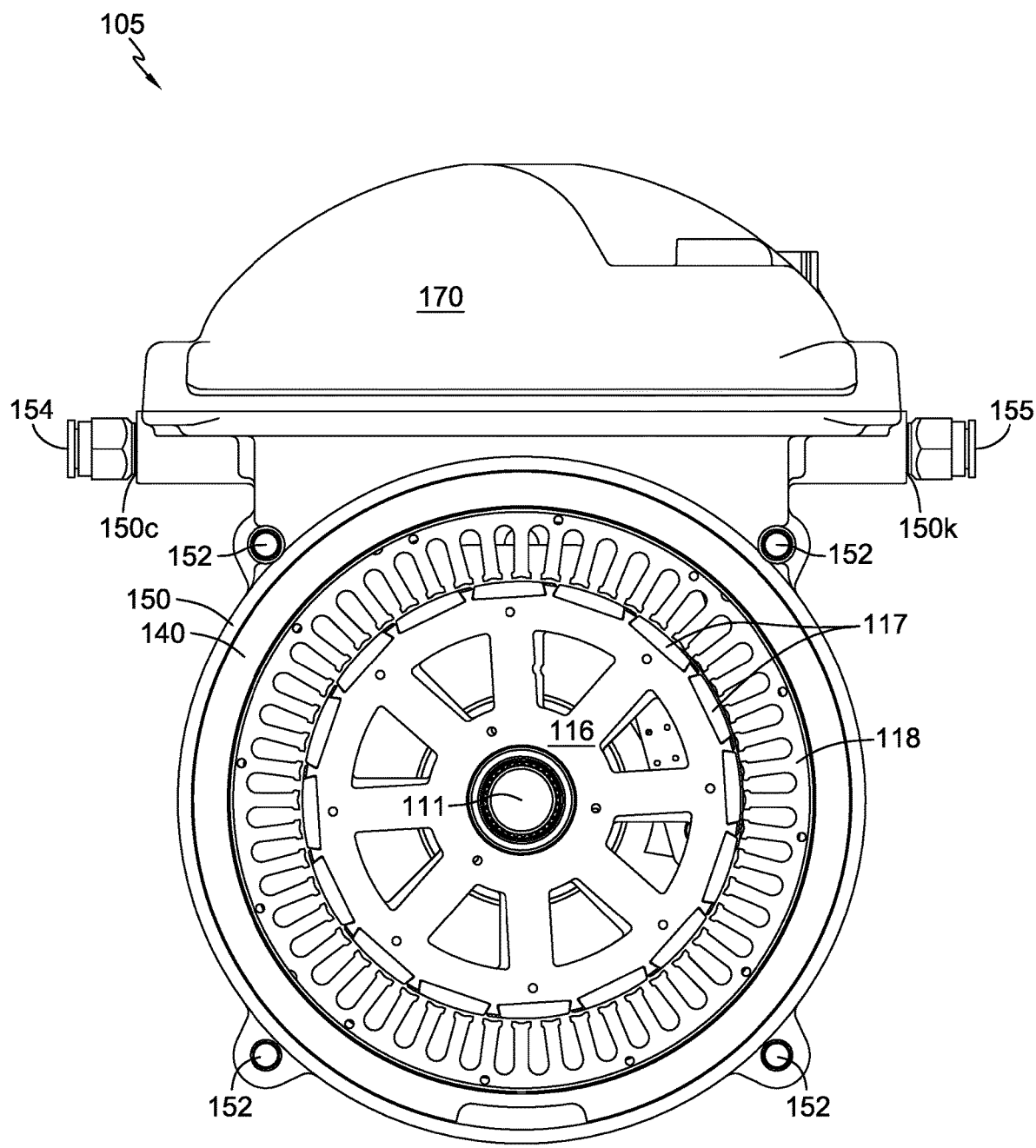
FIG. 9 is an elevational view of the liquid-cooled electric motor assembly of the liquid-cooled electric drive assembly, viewed in the direction opposite that of FIG. 5.
Figure 14:
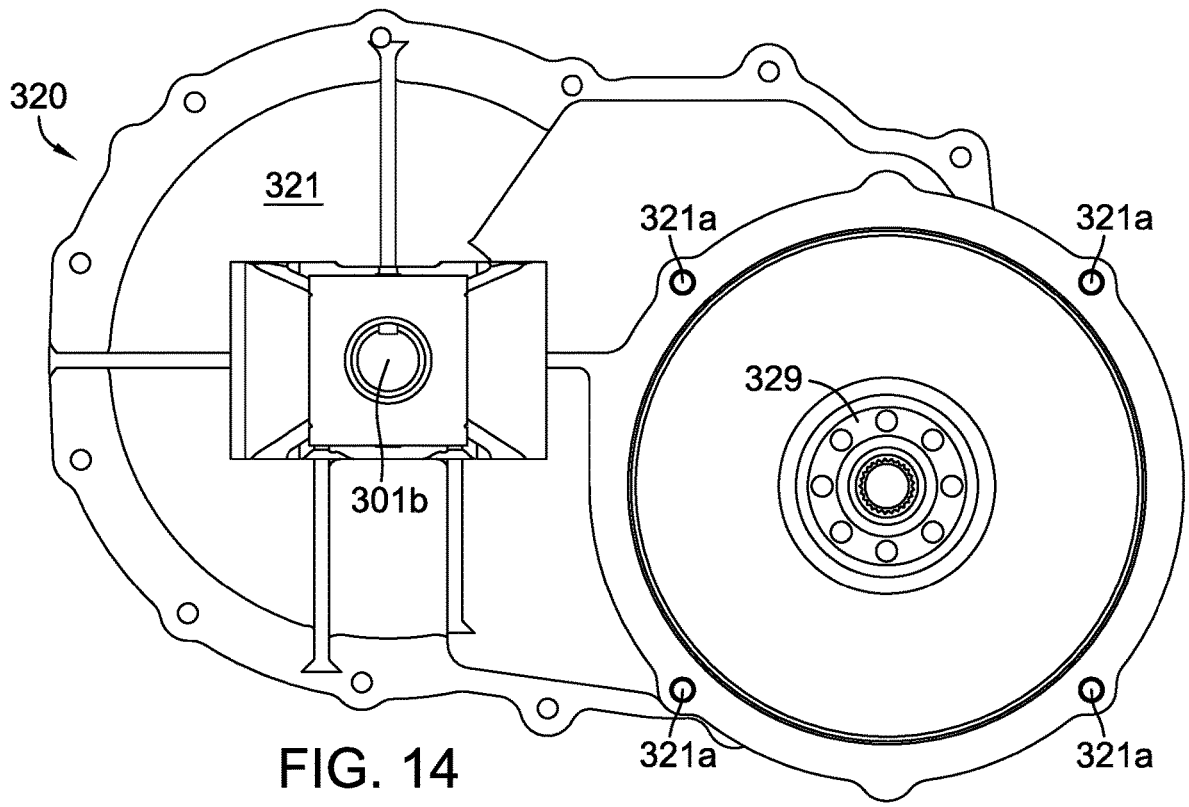
FIG. 14 is an elevational view of a further alternative reduction output assembly for use with a liquid-cooled electric drive, as depicted in FIG. 8.
Figure 15:
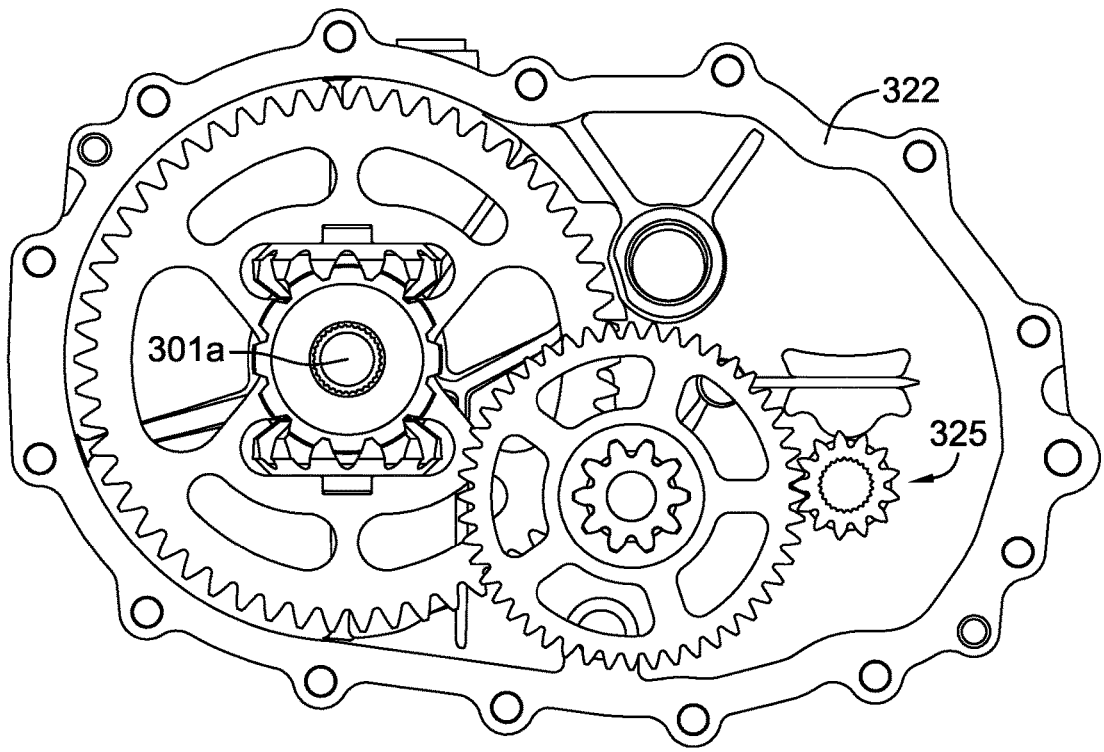
FIG. 15 is an elevational view of the reduction output assembly shown in FIG. 14, with a portion of the housing removed.

The vehicle drive system 300 depicted in FIG. 8 uses liquid-cooled electric motor assembly 105 in conjunction with a single drive assembly 301, which comprises a reduction output assembly 320 as depicted in more detail in FIGS. 14 and 15. Input housing 321 and output housing 322 cooperate to house a conventional reduction gear train and differential 325 to transmit the rotational force of motor output shaft 111 to a pair of output axles 301a, 301b. As in prior embodiments, an input bearing 329 supports motor output shaft 111. Motor attachment points 321a are provided for attachment to fasteners 152. A hub similar to hub 123 may be mounted on each of the axles 301a and 301b. Such a drive system may be used in a vehicle such as a lawn or garden tractor.

The vehicle drive systems 200, 300 depicted in FIGS. 7 and 8 may further incorporate one or more auxiliary electric motors such as liquid-cooled electric deck motors 202L and 202R to power mowing blades. An external coolant circuit for such vehicles includes external lines or "plumbing" for coolant to be exchanged among the various components of the cooling system, and also includes an electric pump 203 and a heat exchanger 204.

In a disclosed embodiment, a liquid-cooled drive assembly 105 is connected to an external coolant circuit to circulate coolant therebetween and forms a portion of a drive assembly. Liquid-cooled drive assembly 105 comprises a housing structure 150 having a jacket chamber 153, and a motor jacket 140 disposed in the housing structure. A coolant groove 140a is formed on and extends around an external surface of motor jacket 140 between a first end 140b and a second end 140c, wherein coolant groove 140a and an internal surface 150a of housing structure 150 cooperate to form a motor wrap coolant passage 144 that extends around a portion of the external surface of motor jacket 140. Electric motor 110 is at least partially disposed in motor jacket 140, and motor output shaft 111 is driven by electric motor 110. Platform 151 is disposed on housing structure 150 and is capable of receiving motor controller assembly 112, platform 151 further comprising a liquid coolant cavity 150b disposed adjacent to at least a portion of motor controller assembly 112 to provide cooling thereto. The liquid coolant cavity 150b comprises an inlet port 150c capable of being connected to the external coolant circuit to receive coolant from the external coolant circuit into the liquid coolant cavity 150b; an outlet port 150k capable of being connected to the external coolant circuit to discharge coolant out of the liquid coolant cavity 150b and into the external coolant circuit; a plurality of channels 150d, 150e, 150f, 150g, 150j disposed between and connected to inlet port 150c and outlet port 150k; a jacket inlet passage 150h located within one of the plurality of channels (150g) and connected to motor wrap coolant passage 144 adjacent to first end 140b of coolant groove 140a, for transmitting the coolant from liquid coolant cavity 150b to motor wrap coolant passage 144; and a jacket outlet passage 150i located within another of the plurality of channels (150j) and connected to motor wrap coolant passage 144 adjacent the second end 140c of the coolant groove 140a for receiving the coolant from the motor wrap coolant passage 144 back into liquid coolant cavity 150b after the coolant has traveled around the external surface of motor jacket 140 through motor wrap coolant passage 144. The outlet port 150k is configured to receive the coolant from jacket outlet passage 150i and to discharge the coolant from liquid coolant cavity 150b through outlet port 150k to the external coolant circuit.

Further, in a disclosed embodiment, an assembly 105 for a liquid-cooled electric motor comprises a housing structure 150 comprising a jacket chamber 153, and a motor jacket 140 comprising an external surface that defines a coolant groove 140a, wherein the motor jacket 140 is sealingly disposed in the jacket chamber 153 such that coolant groove 140a and an internal surface of housing structure 150 define a motor wrap coolant passage 144 that extends circumferentially around the external surface of motor jacket 140. A platform 151 is disposed on housing structure 150 and is configured to house a motor controller assembly 112. Platform 151 defines an inlet port 150c configured to receive coolant from an external coolant circuit, an outlet port 150k configured to discharge the coolant back to the external coolant circuit, a plurality of channels 150d, 150e, 150f, 150g, 150j disposed between and fluidly connected to inlet port 150c and outlet port 150k, a jacket inlet passage 150h positioned to fluidly connect one of the plurality of channels to an inlet of the motor wrap coolant passage to transmit the coolant received from inlet port 150c to motor wrap coolant passage 144, and a jacket outlet passage 150i positioned to fluidly connect another of the plurality of channels to an outlet of motor wrap coolant passage 144 to transmit the coolant that has flowed through motor wrap coolant passage 144 back into the plurality of channels and to outlet port 150k.

In a disclosed embodiment, platform 151 is integrally formed with housing structure 150. Liquid coolant cavity 150b is arranged to enable the coolant to cool the motor controller assembly 112 and the motor wrap coolant passage 144 is arranged to cool the electric motor.

In a disclosed embodiment, liquid coolant cavity 150b extends along a first plane that is perpendicular to a second plane along which motor wrap coolant passage 144 extends. The first plane may extend parallel to control board 160 of motor controller assembly 112 when motor controller assembly 112 is received by platform 151. Second plane may also be perpendicular to a longitudinal axis of electric motor 110.

In a disclosed embodiment, passage cover 167 and a gasket 168 are positioned between liquid coolant cavity 150b and motor controller assembly 112, when platform 151 receives motor controller assembly 112, to seal motor controller assembly 112 from liquid coolant cavity 150b.

In a disclosed embodiment, the plurality of channels are arranged in a maze-like pattern to increase, without implementing fins, a surface area of platform 151 that comes into contact with the coolant flowing through liquid coolant cavity 150b. The plurality of channels may be configured to form a bifurcated flow path for the coolant within liquid coolant cavity 150b.

In a disclosed embodiment, the plurality of channels include split passage 150d fluidly connected to and extending from inlet port 150c, a plurality of cooling passages each of which extends from split passage 150d, an inlet run extending from the plurality of cooling passages and to jacket inlet passage 150h and an outlet run 150j extending from jacket outlet passage 150i to outlet port 150k.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A liquid-cooled electric drive assembly connected to an external coolant circuit to circulate coolant therebetween and forming a portion of a drive assembly, the liquid-cooled electric drive assembly comprising:
 a housing structure comprising a jacket chamber;
 a motor jacket disposed in the jacket chamber and comprising a coolant groove formed on and extending around an external surface of the motor jacket between a first end and a second end, wherein the coolant groove and an internal surface of the housing structure cooperate to form a motor wrap coolant passage that extends around a portion of the external surface of the motor jacket;
 an electric motor at least partially disposed in the motor jacket;
 a motor output shaft driven by the electric motor;
 a platform disposed on the housing structure and capable of receiving a motor controller assembly, the platform further comprising a liquid coolant cavity disposed adjacent to at least a portion of the motor controller assembly to provide cooling thereto, wherein the liquid coolant cavity comprises:
  an inlet port capable of being connected to the external coolant circuit to receive the coolant from the external coolant circuit into the liquid coolant cavity;
  an outlet port capable of being connected to the external coolant circuit to discharge the coolant out of the liquid coolant cavity and into the external coolant circuit;
  a plurality of channels disposed between and connected to the inlet port and the outlet port;
  a jacket inlet passage located within one of the plurality of channels and connected to the motor wrap coolant passage adjacent to the first end of the coolant groove, for transmitting the coolant from the liquid coolant cavity to the motor wrap coolant passage; and
  a jacket outlet passage located within another of the plurality of channels and connected to the motor wrap coolant passage adjacent the second end of the coolant groove for receiving the coolant from the motor wrap coolant passage back into the liquid coolant cavity after the coolant has traveled around the external surface of the motor jacket through the motor wrap coolant passage;
 wherein the outlet port is configured to receive the coolant from the jacket outlet passage and to discharge the coolant from the liquid coolant cavity through the outlet port to the external coolant circuit.

2. The liquid-cooled electric drive assembly of claim 1, wherein the platform is integrally formed with the housing structure.

3. The liquid-cooled electric drive assembly of claim 1, wherein the liquid coolant cavity is arranged to enable the coolant to cool the motor controller assembly and the motor wrap coolant passage is arranged to cool the electric motor.

4. The liquid-cooled electric drive assembly of claim 1, wherein the liquid coolant cavity extends along a first plane that is perpendicular to a second plane along which the motor wrap coolant passage extends.

5. The liquid-cooled electric drive assembly of claim 4, wherein the first plane extends parallel to a control board of the motor controller assembly when the motor controller assembly is received by the platform.

6. The liquid-cooled electric drive assembly of claim 4, wherein the second plane along which the motor wrap coolant passage extends is perpendicular to a longitudinal axis of the electric motor.

7. The liquid-cooled electric drive assembly of claim 1, further comprising a passage cover and a gasket positioned between the liquid coolant cavity and the motor controller assembly, when the platform receives the motor controller assembly, to seal the motor controller assembly from the liquid coolant cavity.

8. The liquid-cooled electric drive assembly of claim 1, wherein the plurality of channels are arranged in a maze-like pattern to increase, without implementing fins, a surface area of the platform that comes into contact with the coolant flowing through the liquid coolant cavity.

9. The liquid-cooled electric drive assembly of claim 1, wherein the plurality of channels are configured to form a bifurcated flow path for the coolant within the liquid coolant cavity.

10. The liquid-cooled electric drive assembly of claim 1, wherein the plurality of channels include:
 a split passage fluidly connected to and extending from the inlet port;
 a plurality of cooling passages each of which extends from the split passage;
 an inlet run extending from the plurality of cooling passages and to the jacket inlet passage; and
 an outlet run extending from the jacket outlet passage to the outlet port.

11. An assembly for a liquid-cooled electric motor, the assembly comprising:
 a housing structure comprising a jacket chamber;
 a motor jacket comprising an external surface that defines a coolant groove, wherein the motor jacket is sealingly disposed in the jacket chamber such that the coolant groove and an internal surface of the housing structure define a motor wrap coolant passage that extends circumferentially around the external surface of the motor jacket; and
 a platform disposed on the housing structure and configured to house a motor controller assembly, wherein the platform defines:
  an inlet port configured to receive coolant from an external coolant circuit;
  an outlet port configured to discharge the coolant back to the external coolant circuit;
  a plurality of channels disposed between and fluidly connected to the inlet port and the outlet port;
  a jacket inlet passage positioned to fluidly connect one of the plurality of channels to an inlet of the motor wrap coolant passage to transmit the coolant received from the inlet port to the motor wrap coolant passage; and
  a jacket outlet passage positioned to fluidly connect another of the plurality of channels to an outlet of the motor wrap coolant passage to transmit the coolant that has flowed through the motor wrap coolant passage back into the plurality of channels and to the outlet port.

12. The assembly of claim 11, wherein the platform is integrally formed with the housing structure.

13. The assembly of claim 11, wherein the plurality of channels are arranged to enable the coolant to cool the motor controller assembly and the motor wrap coolant passage is arranged to cool the liquid-cooled electric motor.

14. The assembly of claim 11, wherein the plurality of channels extend along a first plane that is perpendicular to a second plane along which the motor wrap coolant passage extends.

15. The assembly of claim 14, wherein the first plane extends parallel to a control board of the motor controller assembly received by the platform.

16. The assembly of claim 14, wherein the second plane along which the motor wrap coolant passage extends is perpendicular to a longitudinal axis of the liquid-cooled electric motor.

17. The assembly of claim 11, further comprising a passage cover and a gasket positioned between the plurality of channels and the motor controller assembly received by the platform to seal the motor controller assembly from the plurality of channels.

18. The assembly of claim 11, wherein the plurality of channels are arranged in a maze-like pattern to increase, without implementing fins, a surface area of the platform that comes into contact with the coolant flowing through the plurality of channels.

19. The assembly of claim 11, wherein the plurality of channels are configured to form a bifurcated flow path for the coolant within the platform.

20. The assembly of claim 11, wherein the plurality of channels include:
   a split passage fluidly connected to and extending from the inlet port;
   a plurality of cooling passages each of which extends from the split passage;
   an inlet run extending from the plurality of cooling passages and to the jacket inlet passage; and
   an outlet run extending from the jacket outlet passage to the outlet port.

* * * * *